United States Patent
Kutsuzawa

(10) Patent No.: US 10,858,165 B2
(45) Date of Patent: Dec. 8, 2020

(54) DOUBLE-WALLED CONTAINER

(71) Applicant: Shintaro Kutsuzawa, Tokyo (JP)

(72) Inventor: Shintaro Kutsuzawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 5 days.

(21) Appl. No.: 16/522,428

(22) Filed: Jul. 25, 2019

(65) Prior Publication Data
US 2019/0344948 A1 Nov. 14, 2019

Related U.S. Application Data

(63) Continuation of application No. 15/543,505, filed as application No. PCT/JP2016/000276 on Jan. 20, 2016, now Pat. No. 10,407,232.

(30) Foreign Application Priority Data

Jan. 30, 2015 (JP) .................. 2015-017869

(51) Int. Cl.
*B65D 79/00* (2006.01)
*B29C 48/00* (2019.01)
(Continued)

(52) U.S. Cl.
CPC ........ *B65D 79/005* (2013.01); *B29C 48/0017* (2019.02); *B29C 48/09* (2019.02);
(Continued)

(58) Field of Classification Search
CPC .. B65D 83/0055; B65D 1/0215; B65D 77/06; B65D 1/32
(Continued)

(56) References Cited

U.S. PATENT DOCUMENTS 4,458,830 A * 7/1984 Werding ............ B65D 83/0055
222/131
4,981,238 A * 1/1991 Wenmaekers ..... B65D 83/0055
222/103
(Continued)

FOREIGN PATENT DOCUMENTS

CN 103974881 A 8/2014
CN 107207113 B 3/2019
(Continued)

OTHER PUBLICATIONS

Mar. 2, 2020 Office Action issued in Chinese Patent Application No. 201910112037.6.
(Continued)

*Primary Examiner* — Shawn M Braden
(74) *Attorney, Agent, or Firm* — Oliff PLC

(57) ABSTRACT

A double-walled container includes an outer layer body and an inner layer body. A single adhesive strip is disposed between the outer layer body and the inner layer body in a manner such that the adhesive strip extends along a center axis. The outer layer body is provided with a single ambient air introduction hole. The outer layer body includes an inner surface, which is configured by a separation surface and a pseudo-adhesive surface. The separation surface faces the ambient air introduction hole and is separated from an outer surface of the inner layer body, and the pseudo-adhesive surface faces the separation surface and is separably adhered to the outer surface of the inner layer body.

2 Claims, 8 Drawing Sheets

(51) Int. Cl.
*B29C 48/09* (2019.01)
*B29C 48/21* (2019.01)
*B29C 49/06* (2006.01)
*B65D 1/02* (2006.01)
*B65D 47/08* (2006.01)
*B65D 47/32* (2006.01)
*B65D 83/00* (2006.01)
*B65D 23/02* (2006.01)
*B65D 41/04* (2006.01)
*B65D 43/16* (2006.01)
*B65D 47/20* (2006.01)
*B65D 51/18* (2006.01)

(52) U.S. Cl.
CPC .............. *B29C 48/21* (2019.02); *B29C 49/06* (2013.01); *B65D 1/0215* (2013.01); *B65D 1/0246* (2013.01); *B65D 1/0276* (2013.01); *B65D 23/02* (2013.01); *B65D 41/04* (2013.01); *B65D 43/16* (2013.01); *B65D 47/08* (2013.01); *B65D 47/0838* (2013.01); *B65D 47/20* (2013.01); *B65D 47/32* (2013.01); *B65D 51/18* (2013.01); *B65D 83/0055* (2013.01); *B65D 2205/00* (2013.01); *B65D 2251/009* (2013.01); *B65D 2251/0021* (2013.01); *B65D 2251/0025* (2013.01); *B65D 2251/0028* (2013.01); *B65D 2251/0078* (2013.01); *B65D 2251/0087* (2013.01)

(58) Field of Classification Search
USPC ........................................................ 215/12.2
See application file for complete search history.

(56) References Cited

U.S. PATENT DOCUMENTS

| | | |
|---|---|---|
| 5,435,452 A | 7/1995 | Nishigami et al. |
| 6,997,353 B2* | 2/2006 | Decottignies ......... B05B 11/046 222/105 |
| 9,352,897 B2 | 5/2016 | Hoshino |
| 2001/0040173 A1* | 11/2001 | Yamamoto .............. A45D 19/02 222/106 |
| 2014/0144938 A1 | 5/2014 | Kakuta et al. |
| 2014/0190992 A1 | 7/2014 | Kuwagaki et al. |
| 2016/0040173 A1 | 2/2016 | Yang et al. |
| 2016/0052661 A1 | 2/2016 | Furusawa et al. |
| 2016/0145015 A1* | 5/2016 | Hoshino .............. B65D 1/0215 222/130 |

FOREIGN PATENT DOCUMENTS

| | | |
|---|---|---|
| JP | H07-315435 A | 12/1995 |
| JP | 2003-137241 A | 5/2003 |
| JP | 2011-251697 A | 12/2011 |
| WO | 93/002926 A1 | 2/1993 |
| WO | 2014/208096 A1 | 12/2014 |

OTHER PUBLICATIONS

Apr. 12, 2016 International Search Report issued in International Patent Application No. PCT/JP2016/000276.
Aug. 1, 2017 International Preliminary Report on Patentability issued in International Patent Application No. PCT/JP2016/000276.
Jul. 12, 2018 Office Action issued in Chinese Patent Application No. 201680006049.5.
Oct. 2, 2018 Office Action issued in Japanese Patent Application No. 2015-017869.
Sep. 3, 2018 Extended Search Report issued in European Patent Application No. 16742949.7.
May 23, 2019 Office Action issued in European Patent Application No. 16 742 949.7.

* cited by examiner

A-A section

B-B section

C-C section

DOUBLE-WALLED CONTAINER

This is a Continuation of application Ser. No. 15/543,505 filed on Jul. 13, 2017, which in turn is a PCT National Phase application of PCT/JP2016/000276 filed on Jan. 20, 2016, which claims the benefit of Japanese Patent Application No. 2015-017869 filed on Jan. 30, 2015. The disclosures of the prior applications are hereby incorporated by reference herein in their entirety.

TECHNICAL FIELD

The present disclosure relates to a double-walled container including an outer layer body and an inner layer body that is disposed on the inner side of the outer layer body to contain a content medium.

BACKGROUND

Double-walled containers are used as containers containing cosmetics such as face lotion, shampoo, rinse, liquid soap, various medicines, food seasonings, or the like. Such a double-walled container may include an outer layer body as an outer shell of a regular shape and an inner layer body that is disposed on the inner side of the outer layer body to contain the content medium (refer to, for example, Patent Literature 1). A container of this type includes an ambient air introduction hole in the outer layer body. This configuration permits ambient air to be drawn between the outer layer body and the inner layer body. Accordingly, even when the content medium is dispensed, only the inner layer body undergoes volume reduction and deformation while the shape of the outer layer body remains unchanged.

As described in Patent Literature 1, such a double-walled container generally includes adhesive strips for the purpose of achieving uniform volume reduction and deformation of the whole inner layer body. The adhesive strips are configured to connect the outer layer body and the inner layer body partially and are disposed in a manner such that they oppose to each other about the center axis of the outer layer body. The double-walled container also generally includes two ambient air introduction holes provided at positions that are 90 degrees offset in the circumferential direction with respect to the opposing adhesive strips.

CITATION LIST

Patent Literature

PTL1: JP2003137241A

SUMMARY

Technical Problem

Meanwhile, in cases where opposingly disposed adhesive strips and opposingly disposed two ambient air introduction holes are provided, the inner layer body undergoes volume reduction and deformation symmetrically with respect to the center axis of the outer layer body. This means that four parts are present in the outer layer body: two low-rigidity parts in which the inner layer body is separated from the outer layer body; and two high-rigidity parts in which the inner layer body is connected to the outer layer body by the adhesive strips. Two parts of the same kind are positioned symmetrically with respect to the center axis of the outer layer body. When the outer layer body is held in one hand, a part of the outer layer body on which the thumb is placed and another part of the outer layer body on which the index, middle, third, and little fingers are placed are assumed to be positioned almost symmetrically with respect to the center axis of the outer layer body. Accordingly, the two low-rigidity parts or the two high-rigidity parts of the outer layer body are pressed to dispense the content medium. That is to say, there is no difference in rigidity between the part on which the thumb is placed and the part on which the index, middle, third, and little fingers are placed. The fact that there is no superiority in terms of ease of flexure poses the need to press both the parts with rather strong force to cause these parts to undergo flexure.

The present disclosure is to solve the existing problem, and the present disclosure is to provide a novel double-walled container that dispenses the content medium with as small pressing force as possible.

Solution to Problem

One of aspects of the present disclosure resides in a double-walled container including an outer layer body and an inner layer body. The outer layer body includes a mouth with an open upper side, a trunk, and a bottom. The inner layer body includes filling space to contain a content medium, is disposed on an inner side of the outer layer body, and is configured to undergo volume reduction and deformation in conjunction with dispensing of the content medium from the filling space. A single adhesive strip is disposed between the outer layer body and the inner layer body in a manner such that the adhesive strip extends along a center axis of the outer layer body and couples the outer layer body and the inner layer body partially. The outer layer body is provided, in a position that is offset in a circumferential direction with respect to the adhesive strip, with a single ambient air introduction hole through which ambient air is drawn between the outer layer body and the inner layer body. The outer layer body includes an inner surface configured by a separation surface and a pseudo-adhesive surface. The separation surface faces the ambient air introduction hole and is separated from an outer surface of the inner layer body, and the pseudo-adhesive surface faces the separation surface and is separably adhered to the outer surface of the inner layer body.

In a preferred embodiment, the double-walled container further includes a guide unit that guides the outer layer body into a state where the separation surface and the pseudo-adhesive surface are positioned on both sides in a horizontal direction when the outer layer body is displaced to a tilted position to dispense the content medium.

In another preferred embodiment, the mouth is fitted with a dispensing cap though which the content medium contained in the filling space is dispensed to outside, the dispensing cap is provided with a cap body that is coupled thereto via a hinge, and the hinge, which is disposed above the dispensing cap in the state where the separation surface and the pseudo-adhesive surface are positioned on both the sides in the horizontal direction and where the outer layer body is displaced to the tilted position, serves as the guide unit.

In yet another preferred embodiment, the mouth is fitted with a dispensing cap though which the content medium contained in the filling space is dispensed to outside, the dispensing cap including a ceiling wall covering an opening of the mouth and a dispensing tube rising from the ceiling wall, and the dispensing tube, which is provided with a lower side part that is longer than remaining parts thereof in the state where the separation surface and the pseudo-adhesive surface are positioned on both the sides in the horizontal direction and where the outer layer body is displaced to the tilted position, serves as the guide unit.

In yet another preferred embodiment, the mouth is fitted with a dispensing cap though which the content medium contained in the filling space is dispensed to outside, the dispensing cap is provided with a dispensing tube including, at a top thereof, a lip whose tip is curved to an outer side in a radial direction, and the lip, which is provided only in a lower side part of the top in the state where the separation surface and the pseudo-adhesive surface are positioned on both the sides in the horizontal direction and where the outer layer body is displaced to the tilted position, serves as the guide unit.

In yet another preferred embodiment, the ambient air introduction hole is provided at a position that is 90 degrees offset in the circumferential direction with respect to the adhesive strip.

Advantageous Effect

In the present disclosure, the single adhesive strip is disposed between the outer layer body and the inner layer body in a manner such that the adhesive strip extends along the center axis of the outer layer body and couples the outer layer body and the inner layer body partially. Furthermore, the outer layer body is provided, in the position that is offset in the circumferential direction with respect to the adhesive strip, with the single ambient air introduction hole through which ambient air is drawn between the outer layer body and the inner layer body. Moreover, the outer layer body includes an inner surface configured by a separation surface and a pseudo-adhesive surface, the separation surface facing the ambient air introduction hole and being separated from the outer surface of the inner layer body, and the pseudo-adhesive surface facing the separation surface and being separably adhered to the outer surface of the inner layer body. That is to say, the rigidity of the outer layer body is greater on the side where the pseudo-adhesive surface is positioned than on the side where the separation surface is positioned. Accordingly, when the outer layer body is pressed, the side where the separation surface is positioned undergoes flexure preferentially. In other words, when the outer layer body is held in one hand, one of the part of the outer layer body on which the thumb is placed and the other part of the outer layer body on which the index, middle, third, and little fingers are placed undergoes flexure preferentially. Accordingly, compared with cases where both the parts are subject to flexure, less pressure is necessary to dispense the content medium.

DETAILED DESCRIPTION

Figure 1:
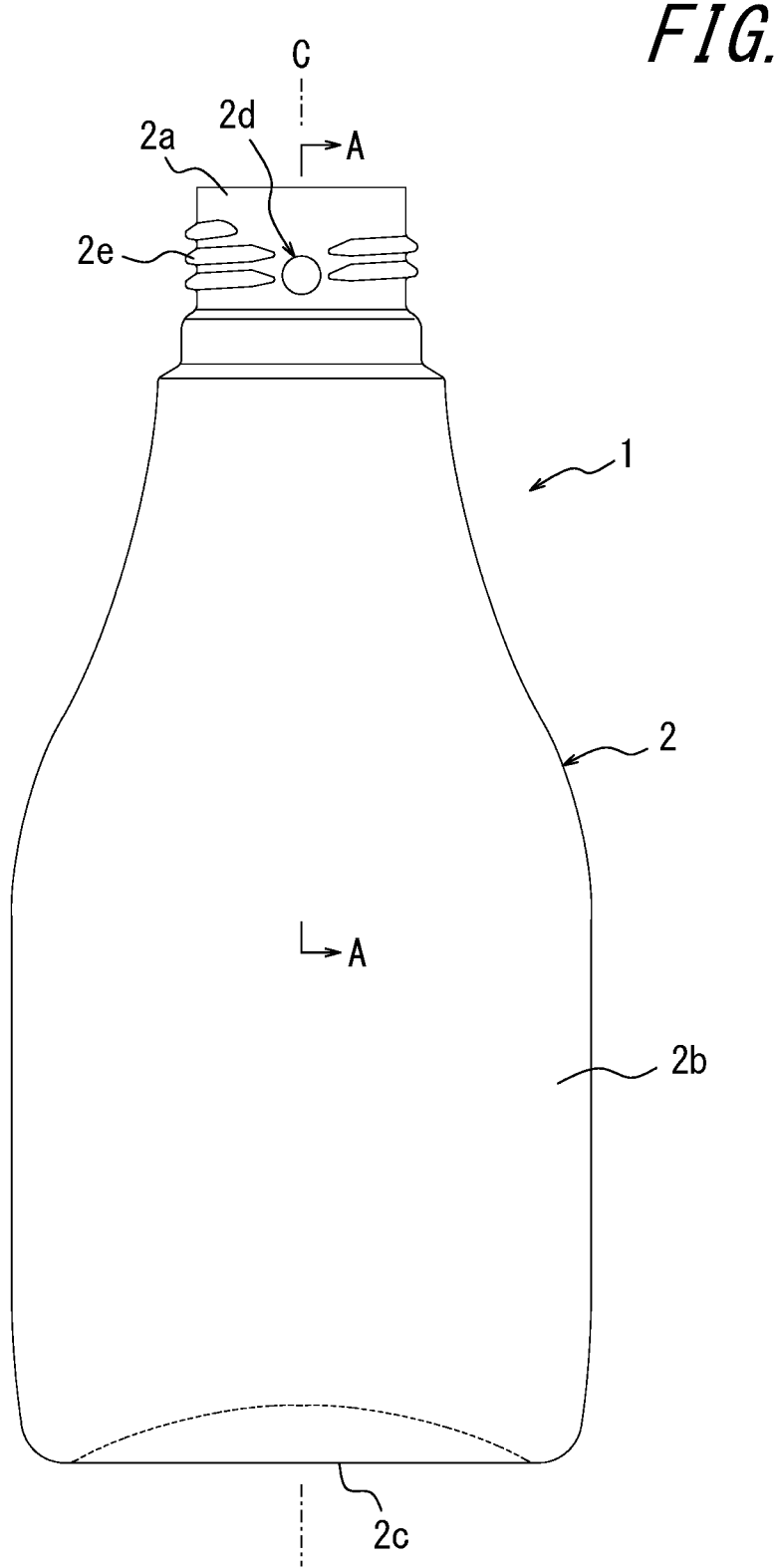
FIG. 1 is a front view illustrating a double-walled container according to one of embodiments of the present disclosure.

The present disclosure will be described in more detail below with reference to the drawings. In the figures, reference numeral 1 denotes a double-walled container according to embodiments of the present disclosure. As illustrated in FIGS. 1 through 4, the double-walled container 1 includes an outer layer body 2 and an inner layer body 3. The inner layer body 3 forms an outer shell of the container. The inner layer body 3 includes a filling space M, which is configured to contain a content medium, and is disposed on the inner side of the outer layer body 2.

Figure 2:
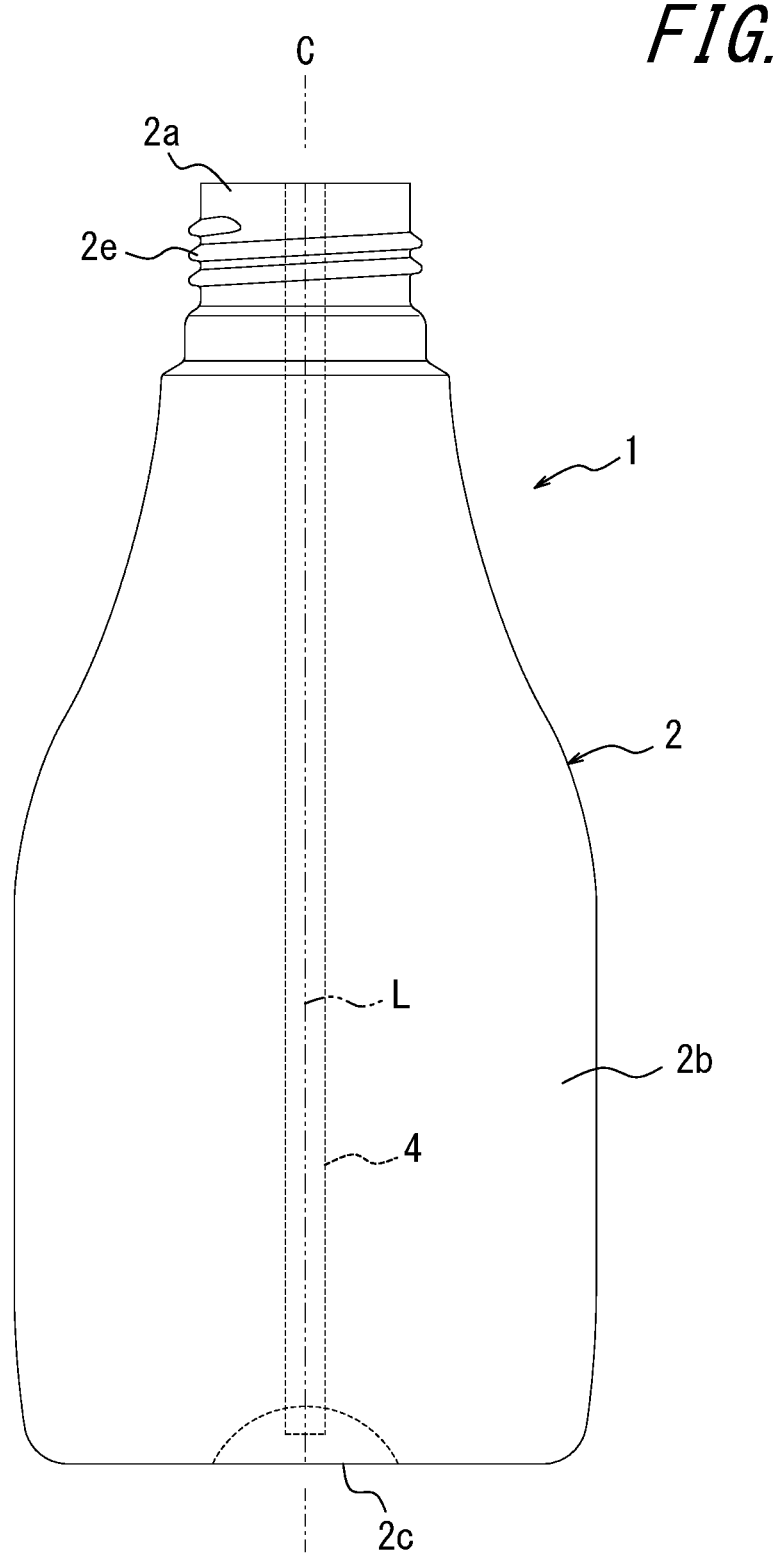
FIG. 2 is a side view illustrating a double-walled container of FIG. 1.
Figure 3:
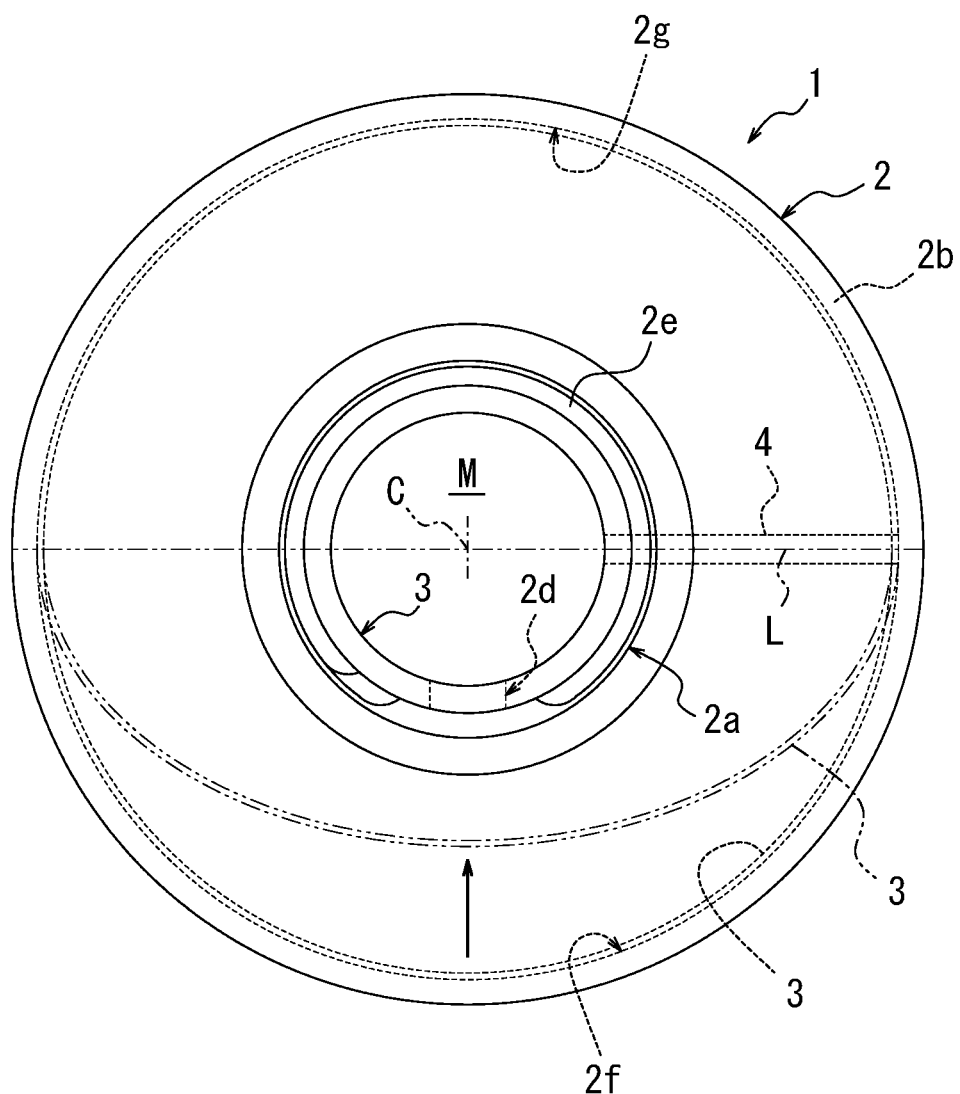
FIG. 3 is a plan view illustrating a double-walled container of FIG. 1.
Figure 4:
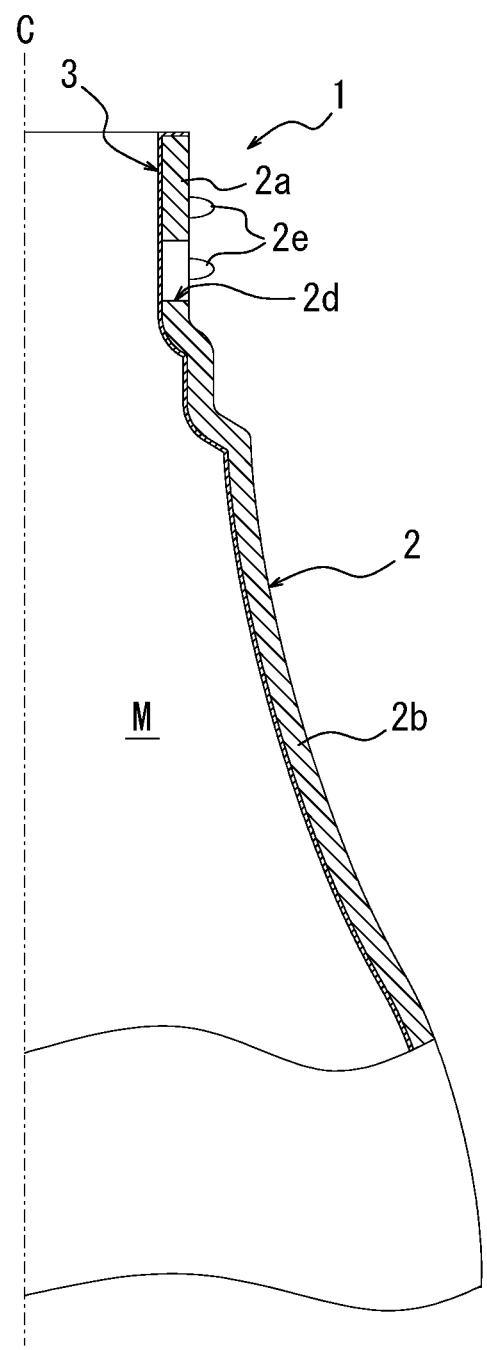
FIG. 4 is a sectional view taken along a line A-A of FIG. 1.

The outer layer body 2 is made of synthetic resin, such as polyethylene and polypropylene, and the outer layer body 2 has a regular shape. As illustrated in FIGS. 1 and 2, the outer layer body 2 includes a cylindrical-shaped mouth 2a, a cylindrical-shaped trunk 2b, and a bottom 2c. The mouth 2a has an open upper side. The trunk 2b has a diameter that is larger than that of the mouth 2a. The trunk 2b also has one end coupled to the mouth 2a and the other end closed by the bottom 2c. The outer layer body 2 in the present embodiment is configured by a mold used for blow molding. The mold may be split into two parts along the center axis C of the outer layer body 2. As illustrated in FIGS. 2 and 3, a parting line L, which corresponds to a split surface of the mold, is formed in the mouth 2a, the trunk 2b, and the bottom 2c.

The mouth 2a is provided with a single hole (ambient air introduction hole) 2d, which passes through the mouth 2a. In the present embodiment, the ambient air introduction hole 2d is provided at a position that is 90 degrees offset in the circumferential direction with respect to the parting line L. The ambient air introduction hole 2d may be provided at any position in the circumferential direction, except for the position of an adhesive strip, which is described later. The ambient air introduction hole 2d may also be provided offset in the direction of the center axis C or provided in the trunk 2b or the bottom 2c. Furthermore, the mouth 2a is provided, on an outer surface thereof excluding the ambient air introduction hole 2d, with a screw part 2e. The screw part 2e is used to fit a dispensing cap, which is described later.

The inner layer body 3 is made of flexible and thin synthetic resin. In the present embodiment, a material (e.g., ethylene-vinylalcohol copolymer and nylon, such as polyamide) having a low compatibility with the outer layer body 2 is used.

Between the outer layer body 2 and the inner layer body 3, a single adhesive strip 4 is disposed. The adhesive strip 4 extends along the center axis C of the outer layer body 2 and connects the outer layer body 2 and the inner layer body 3. In the present embodiment, as illustrated in FIG. 3, the adhesive strip 4 is disposed on the parting line L and extends from an end of the mouth 2a to a coupling part between the trunk 2b and the bottom 2c. Additionally, the length and the starting position of the adhesive strip 4 may be selected in various ways. For example, the adhesive strip 4 may extend from the end of the mouth 2a to a middle of the bottom 2c or may extend only in the trunk 2b.

The outer layer body 2 has an inner surface, which, except for a part thereof in which the adhesive strip 4 is disposed, is configured by a separation surface 2f (which corresponds to a region extending through 180 degrees in the clockwise direction about the center axis C from an edge of the adhesive strip 4 in FIG. 3) and a pseudo-adhesive surface 2g (which corresponds to a region extending through 180 degrees in the anti-clockwise direction from the edge of the adhesive strip 4 in FIG. 3). The separation surface 2f faces the ambient air introduction hole 2d and is separated from an outer surface of the inner layer body 3. The pseudo-adhesive surface 2g faces the separation surface 2f and is separably adhered to the outer surface of the inner layer body 3.

The double-walled container 1 in the present embodiment may be obtained, for example, as follows. Firstly, a laminated parison is extrusion molded. This may be achieved by co-extruding, through a dice used for multi-layer extrusion molding, a tubular-shaped outer layer parison, which is to form the outer layer body 2, a tubular-shaped inner layer parison, which is to form the inner layer body 3, and a longitudinal strip-shaped adhesive layer, which is disposed between the outer layer parison and the inner layer parison and which is to form the adhesive strip 4. Then, the laminated parison is subjected to blow molding in the state where the laminated parison is sandwiched in a mold used for blow molding that is positioned below the dice. In this example, the ambient air introduction hole 2d may be formed with use of a punch or the like after the blow molding. Immediately after the molding, the inner surface of the outer layer body 2, except for the part thereof in which the adhesive strip 4 is disposed, is separatably adhered to the outer surface of the inner layer body 3 over the entire circumference. However, blowing air to the inner layer body 3 through the ambient air introduction hole 2d permits the inner layer body 3 to separate from the outer layer body 2. Thus, the separation surface 2f is formed.

In the above double-walled container 1, a dispensing cap 10, which is illustrated in FIGS. 5 through 8 may be fitted to the mouth 2a to dispense the content medium contained in the filling space M. The dispensing cap 10, which is illustrated in FIGS. 5 through 8, includes an inside plug 11, a displaceable valve body 12, a check valve 13, and a dispensing cap's main body 14. The dispensing cap's main body 14 is also provided, on the side thereof, with a cap body 16 integrally via a hinge 15.

The inside plug 11 includes a through hole 11a, through which the content medium passes, and a tubular-shaped wall 11b, which has open ends. The inside plug 11 is disposed in the opening of the mouth 2a. The displaceable valve body 12 has a spherical shape. The displaceable valve body 12 is arranged inside the tubular-shaped body 11b in a manner such that the valve body 12 is displaceable along the axis line of the tubular-shaped wall 11b. The check valve 13 is configured as a so-called three-piece valve and disposed on an upper surface of the inside plug 11. The check valve 13 has a valve body 13a, which is normally seated on the upper surface of the inside plug 11 to close the through hole 11a. Additionally, the valve body 13a does not block the tubular-shaped wall 11b completely, and a gap defined by an elastic piece supporting the valve body 13a is always unblocked. The dispensing cap's main body 14 includes a ceiling wall 14a, which, together with the inside plug 11, covers the opening of the mouth 2a, and a fitting tube 14b, which is coupled to an edge of the ceiling wall 14a and which is held to the mouth 2a. The ceiling wall 14a is provided with a cylindrical-shaped dispensing tube 14c. The dispensing tube 14c is also provided, at a top thereof, with a lip 14d, whose tip is curved to the outer side in the radial direction. Furthermore, the ceiling wall 14a is provided with a vent 14e, through which air may be drawn between the outer layer body 2 and the inner layer body 3.

With the above dispensing cap 10, when the outer layer body 2 is displaced to a tilted position, the filling space M is pressurized, and the valve body 13a moves away from the inside plug 11. In conjunction with this movement, the content medium contained in the filling space M is dispensed from the dispensing tube 14c through the through hole 11a. At this time, the displaceable valve body 12 is also displaced inside the tubular wall 11b toward the dispensing tube 14c. Subsequently, when the pressure to the outer layer body 2 is released to return the outer layer body 2 to its original position, the pressure in the filling space M is decreased. Accordingly, the valve body 13a is seated on the inside plug 11 and thus, closes the through hole 11a. At this time, the displaceable valve body 12 is also returned to its original position. In conjunction with this, the content medium in the dispensing tube 14c is drawn (sucked) back through the always unblocked gap defined by the elastic piece supporting the valve body 13a. This helps prevent liquid dripping from the dispensing tube 14c. Additionally, as the pressure is released, the outer layer body 2 tries to return to its original shape, and accordingly, negative pressure is generated in space between the outer layer body 2 and the inner layer body 3. The negative pressure in turn draws ambient air into the dispensing cap's main body 14 through the vent 14e. The ambient air is then introduced between the outer layer body 2 and the inner layer body 3 through the ambient air introduction hole 2d. Thus, only the outer layer body 2 is restored while the inner layer body 3 remains in a volume-reduced, deformed state.

In thus configured double-walled container 1, the rigidity of the outer layer body 2 is smaller on the side where the separation surface 2f is positioned than on the side where the pseudo-adhesive surface 2g is positioned. This is due to a reduced thickness by the lack the inner layer body 3 on the side where the separation surface 2f is positioned. Accordingly, when the outer layer body 2 is pressed by one hand to dispense the content medium, the side where the separation surface 2f is positioned in the outer layer body 2 undergoes flexure in priority to the side where the pseudo-adhesive surface 2g is positioned in the outer layer body 2. That is to say, compared with an existing double-walled container, in which the opposing parts of the outer layer body 2 are both subject to flexure, less pressure is necessary to dispense the content medium.

Furthermore, in the double-walled container 1, holding the outer layer body 2 from above facilitates pressing of the outer layer body 2 at the time of displacing the outer layer body 2 to the tilted position to dispense the content medium. In other words, in the above state, balls of the fingers pressing the outer layer body 2 are assumed to be positioned on both sides in the horizontal direction of the center axis of the outer layer body 2. Accordingly, it is preferable to position the separation surface 2f and the pseudo-adhesive surface 2g on both the sides in the horizontal direction. Preferably, the double-walled container 1 is provided with a guide unit that permits a user to hold the outer layer body 2 in the above state without having to be particularly aware of that.

Examples of the guide unit may include the hinge 15, which is illustrated in FIGS. 5 through 8. The hinge 15 herein is disposed to be positioned above the dispensing cap 10 in the state where the separation surface 2f and the pseudo-adhesive surface 2g are positioned on both the sides in the horizontal direction and where the outer layer body 2 is displaced to the tilted position. That is to say, when the cap body 16 is opened to dispense the content medium, the outer layer body 2 is held naturally in a position where the hinge 15 is positioned above the dispensing cap 10 (by which the opened cap body 16 is positioned above the dispensing cap) so that the cap body 16 does not prevent dispensing of the content medium. Thus, the separation surface 2f and the pseudo-adhesive surface 2g are guided to be positioned on both the sides in the horizontal direction, as desired.

Figure 5:
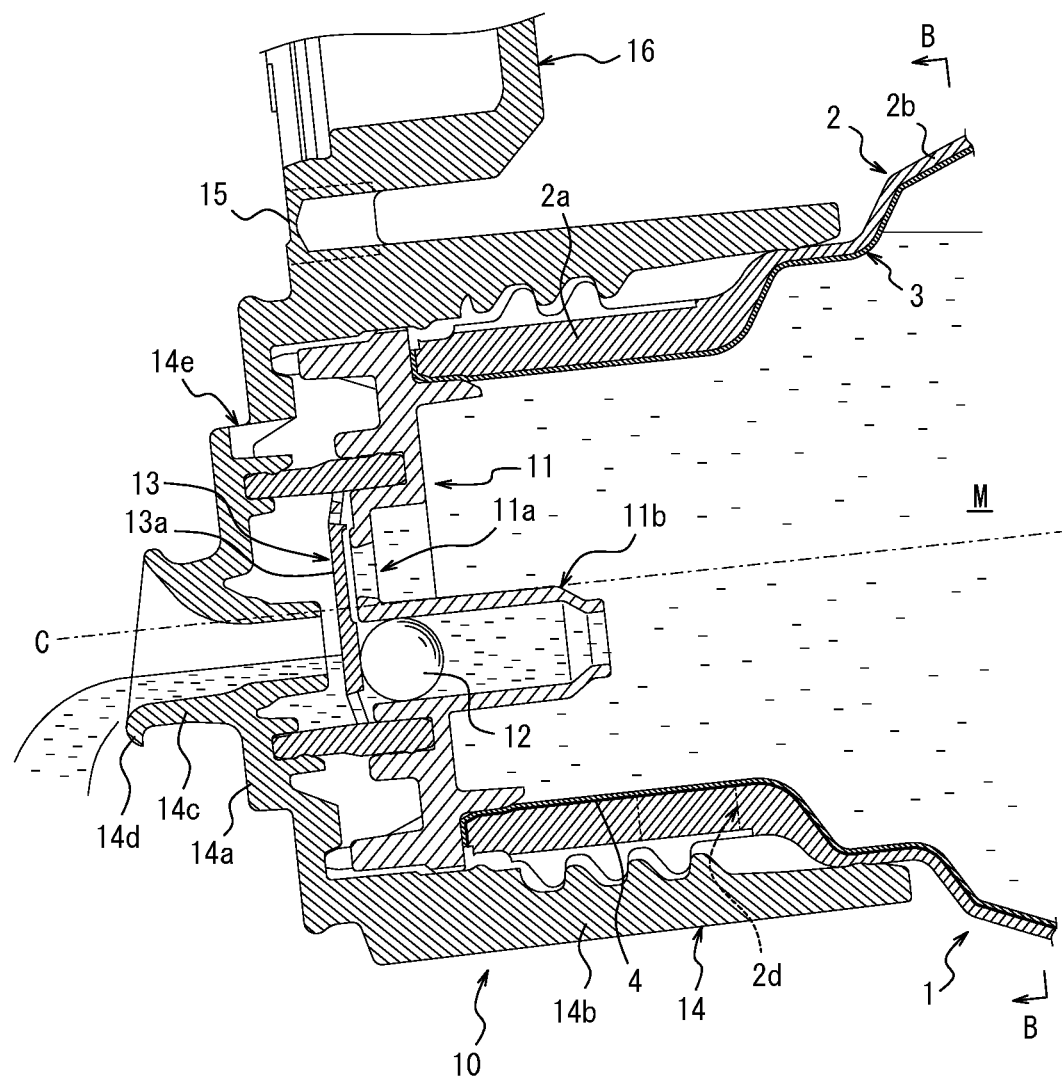
FIG. 5 is a side sectional view illustrating a double-walled container of FIG. 1 that is fitted with a dispensing cap according to another embodiment of the present disclosure.
Figure 6:
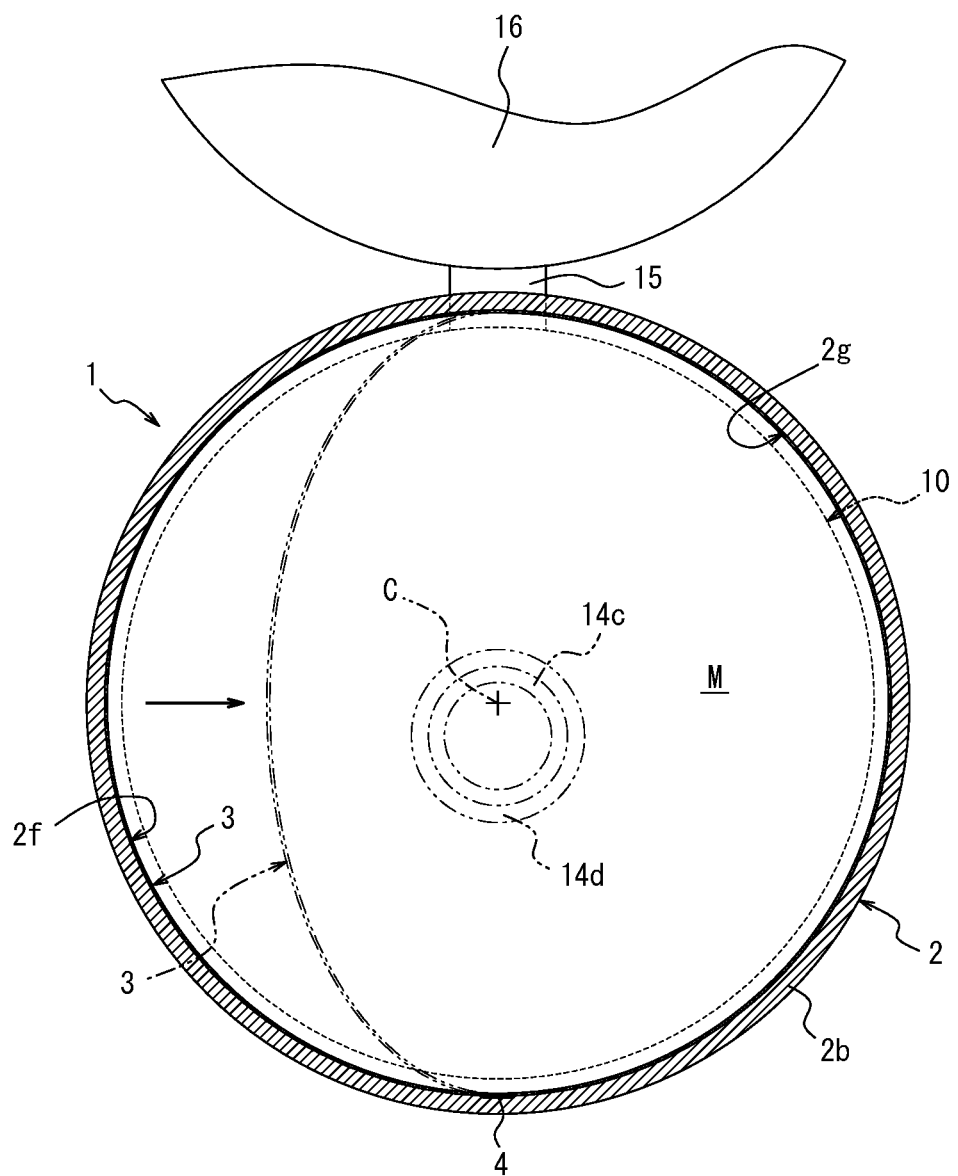
FIG. 6 is a sectional view taken along a line B-B of FIG. 5.
Figure 7:
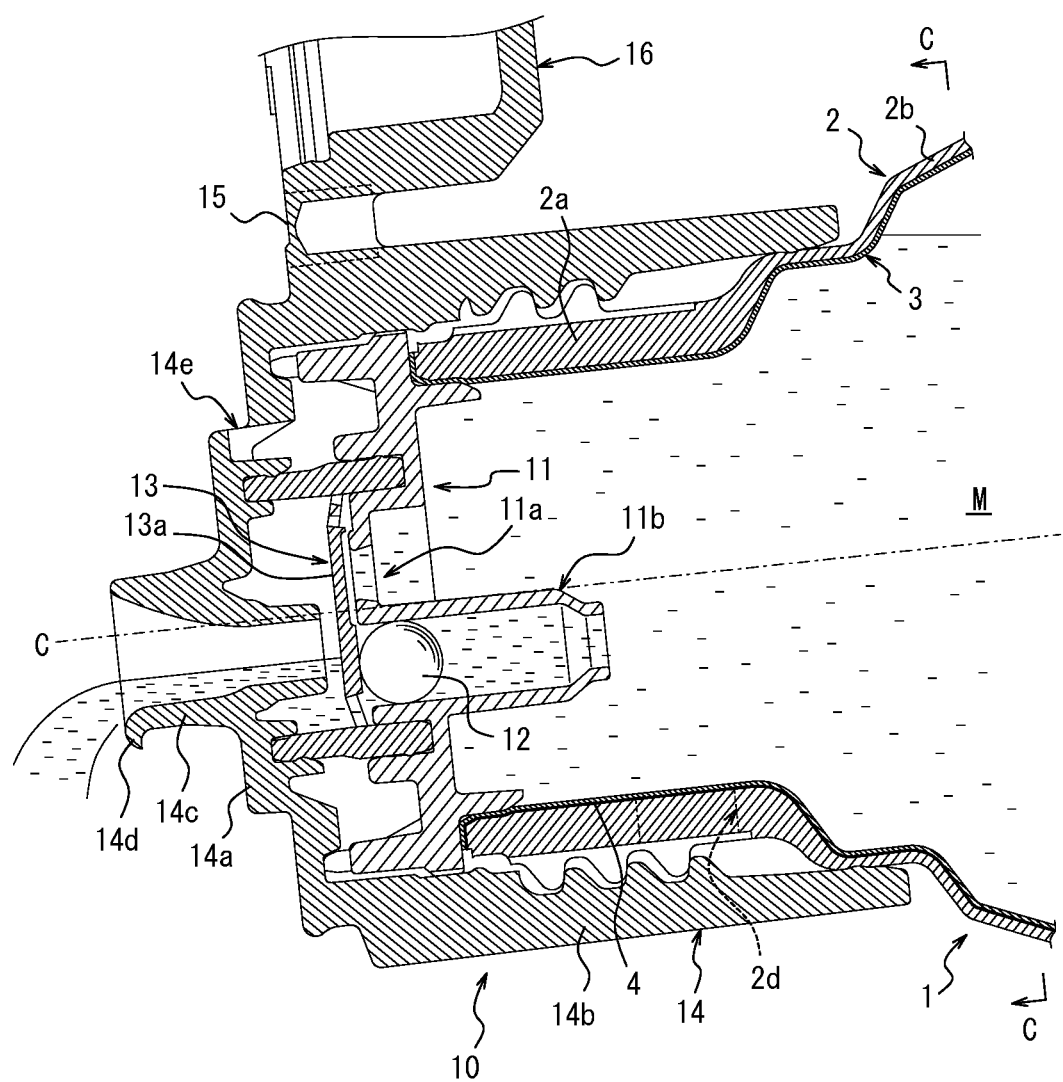
FIG. 7 is a side sectional view illustrating a double-walled container fitted with another dispensing cap, instead of a dispensing cap of FIG. 5, according to yet another embodiment of the present disclosure.
Figure 8:
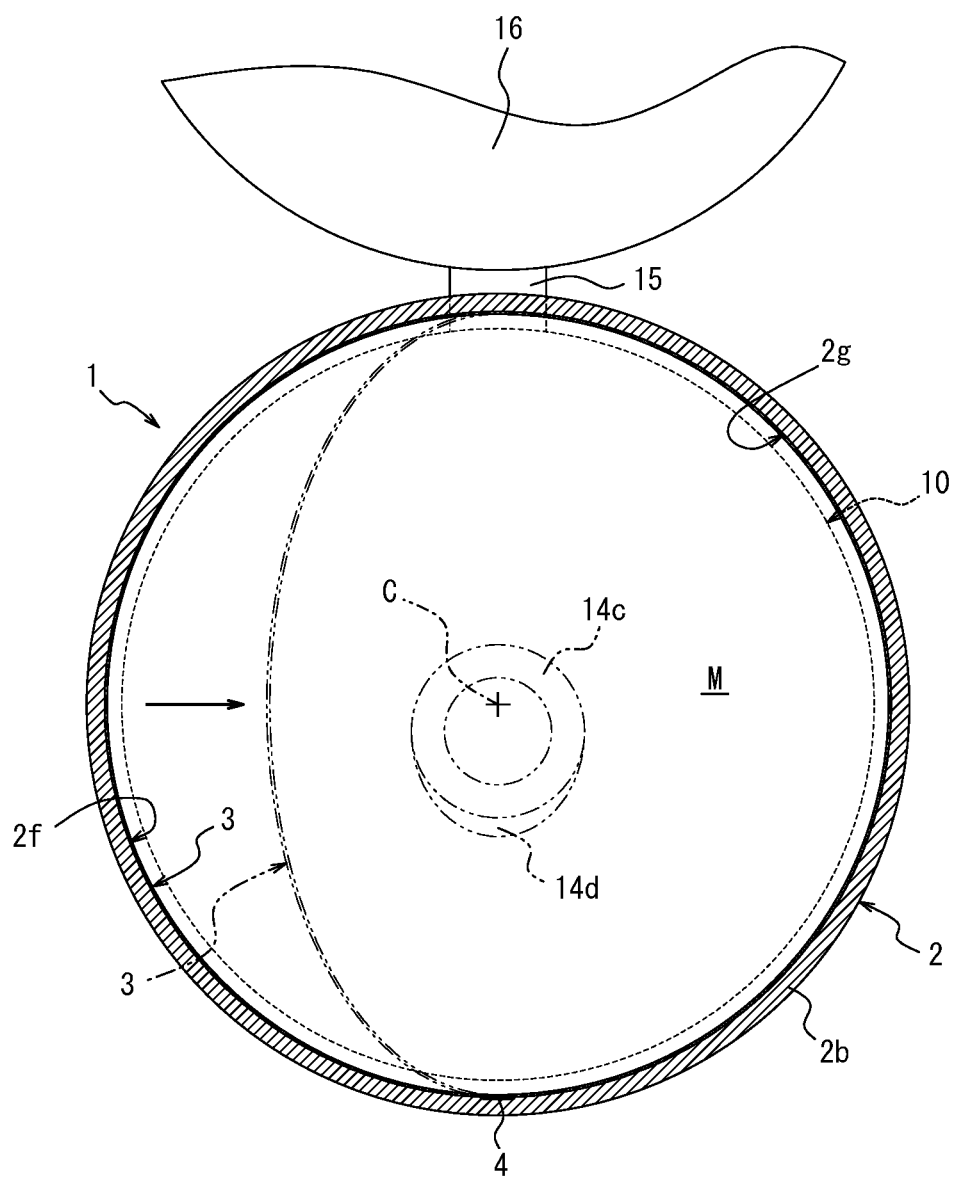
FIG. 8 is a sectional view taken along a line C-C of FIG. 7.

Other examples of the guide unit may include the dispensing tube 14c, which is illustrated in FIGS. 5 and 6. The dispensing tube 14c herein is provided with a lower side part that is longer than remaining parts in the state where the separation surface 2f and the pseudo-adhesive surface 2g are positioned on both the sides in the horizontal direction and where the outer layer body 2 is displaced to the tilted position. Other examples may also include the lip 14d, which is illustrated in FIGS. 7 and 8. The lip 14d herein is provided only in the lower side part of the top of the dispensing tube 14c in the state where the separation surface 2f and the pseudo-adhesive surface 2g are positioned on both the sides in the horizontal direction and where the outer layer body 2 is displaced to the tilted position. Additionally, the guide unit is not limited to any of the above examples, and a variety of configurations may be adopted. For example, the outer surface of the outer layer body 2 may be provided, on the sides thereof where the separation surface 2f and the pseudo-adhesive surface 2g are positioned, with concave or convex parts against which fingers may be placed.

Additionally, if the area of the separation surface 2f is too small relative to the area of the pseudo-adhesive surface 2g, the inner layer body 3 might not undergo sufficient volume reduction and deformation when the content medium is dispensed. On the other hand, if the area of the separation surface 2f is too large relative to the area of the pseudo-adhesive surface 2g, the range of the outer layer body 2 that may be imparted with high priority in terms of ease of flexure is decreased. In contrast, in cases where the separation surface 2f and the pseudo-adhesive surface 2g are disposed at positions that are 90 degrees offset in the circumferential direction with respect to the adhesive strip 4 as in the present embodiment, the following benefit is provided. That is to say, since substantially one-half of the inner surface of the outer layer body 2 about the adhesive strip 4 forms the separation surface 2f, and the other half forms the pseudo-adhesive surface 2g, both the functions described above are compatible effectively.

REFERENCE SIGNS LIST

1: Double-walled container
2: Outer layer body
2a: Mouth
2b: Trunk
2c: Bottom
2d: Ambient air introduction hole
2e: Screw part
2f: Separation surface
2g: Pseudo-adhesive surface
3: Inner layer body
4: Adhesive strip
10: Dispensing cap
11: Inside plug
11a: Through hole
11b: Tubular-shaped wall
12: Displaceable valve body
13: Check valve
13a: Valve body
14: Dispensing cap's main body
14a: Ceiling wall
14b: Fitting tube
14c: Dispensing tube
14d: Lip
14e: Vent
15: Hinge
16: Cap body
C: Center axis
L: Parting line
M: Filling space

The invention claimed is:

1. A double-walled container comprising:
an outer layer body including a mouth with an open upper side, a trunk, and a bottom;
an inner layer body including a filling space to contain a content medium, the inner layer body being disposed on an inner side of the outer layer body, the inner layer body being configured to reduce in volume and deform in accordance with dispensing of the content medium from the filling space; and
a single adhesive strip disposed between the outer layer body and the inner layer body such that the adhesive strip extends along a center axis of the outer layer body and partially couples the outer layer body and the inner layer body, wherein:
the outer layer body includes:
a single ambient air introduction hole through which ambient air is drawn between the outer layer body and the inner layer body, the ambient air introduction hole being located in a position that is offset in a circumferential direction with respect to the adhesive strip, and
an inner surface configured by a separation surface and a pseudo-adhesive surface, the separation surface facing the ambient air introduction hole and being separated from an outer surface of the inner layer body, and the pseudo-adhesive surface facing the separation surface and being separably adhered to the outer surface of the inner layer body, and
the mouth of the outer layer body is fitted with a dispensing cap though which the content medium contained in the filling space is dispensed to outside of the double-walled container, the dispensing cap being provided with a dispensing tube including a lip at a top of the dispensing tube, the lip having a tip that is curved to an outer side in a radial direction, and the lip being located only in a lower side part of the top of the dispensing tube when the separation surface and the pseudo-adhesive surface are positioned on both of the sides in a horizontal direction and when the outer layer body is displaced to a tilted position.

2. The double-walled container according to claim 1, wherein the ambient air introduction hole is located at a position that is 90 degrees offset in the circumferential direction with respect to the adhesive strip.

* * * * *